US005130177A

United States Patent [19]

Lu et al.

[11] Patent Number: 5,130,177

[45] Date of Patent: Jul. 14, 1992

[54] CONDUCTIVE COATING COMPOSITIONS

[75] Inventors: Chin H. Lu, Freemont; Joseph S. Chow, Hillsborough, both of Calif.

[73] Assignee: Xerox Corporation, Stamford, Conn.

[21] Appl. No.: 473,542

[22] Filed: Feb. 1, 1990

[51] Int. Cl.$^5$ .................................................. B32B 9/00

[52] U.S. Cl. .................................... 428/195; 428/204; 428/206; 428/219; 428/411.1; 428/913

[58] Field of Search ............... 428/195, 219, 204, 206, 428/913, 411.1

[56] References Cited

U.S. PATENT DOCUMENTS

| | | | |
|---|---|---|---|
| 2,537,114 | 1/1951 | Young et al. | 117/155 |
| 3,230,873 | 1/1966 | Ort | 101/149.2 |
| 3,642,663 | 2/1972 | Greer | 252/500 |
| 3,663,461 | 5/1972 | Witt | 260/2 BP |
| 3,784,529 | 1/1974 | Bayer et al. | 260/79.3 M |
| 3,813,264 | 5/1974 | Boothe et al. | 117/201 |
| 3,835,102 | 9/1974 | Shimohara et al. | 260/78.4 N |
| 3,956,571 | 5/1976 | Takao et al. | 428/513 |
| 3,971,680 | 7/1976 | Schneider et al. | 428/537 |
| 3,991,256 | 11/1976 | Cornier et al. | 428/514 |
| 4,774,022 | 9/1988 | Sumi et al. | 252/500 |
| 4,948,664 | 8/1990 | Brociner | 428/331 |

*Primary Examiner*—Patrick J. Ryan
*Assistant Examiner*—Kam F. Lee
*Attorney, Agent, or Firm*—Judith L. Byorick

[57] ABSTRACT

Disclosed is a conductive coating composition comprising a diquaternary ammonium compound of the formula

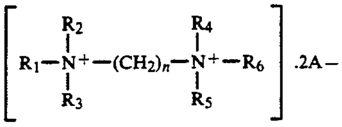

wherein $R_1$ ia an alkyl group or alkylene group having from about 12 to about 22 carbon atoms, $R_2$, $R_3$, $R_4$, $R_5$, and $R_6$ are independently selected from the group consisting of alkyl groups and aryl groups having from 1 to 8 carbon atoms, n is a number of from 1 to about 5, and A is an anion. Also disclosed is an electrographic paper which comprises a base sheet coated on one surface with a dielectric coating composition and on its opposite surface with a conductive composition comprising a diquaternary ammonium compuond of the formula shown. In addition, an electrographic imaging process is disclosed which comprises (a) providing an electrographic paper comprising a base sheet coated on one surface with a dielectric coating composition and on its opposite surface with a conductive coating which comprises a diquaternary ammonium compound of the formula shown; (b) generating an electrostatic latent image on the paper with an electrographic writing means; and (c) developing the latent image.

36 Claims, No Drawings

CONDUCTIVE COATING COMPOSITIONS

BACKGROUND OF THE INVENTION

The present invention is directed to conductive coating compositions. More specifically, the present invention is directed to conductive coating compositions containing a diquaternary ammonium compound. The coating compositions of the present invention are suitable for preparing electrographic papers useful in electrographic imaging. One embodiment of the present invention is directed to a coating composition comprising a diquaternary ammonium compound of the formula $$\left[ R_1-\overset{\overset{R_2}{|}}{\underset{\underset{R_3}{|}}{N^+}}-(CH_2)_n-\overset{\overset{R_4}{|}}{\underset{\underset{R_5}{|}}{N^+}}-R_6 \right] .2A-$$

wherein $R_1$ is an alkyl group or alkylene group having from about 12 to about 22 carbon atoms, $R_2$, $R_3$, $R_4$, $R_5$, and $R_6$ are independently selected from the group consisting of alkyl groups and aryl groups having from 1 to about 8 carbon atoms, n is a number from 1 to about 5, and A is an anion.

Conductive coating compositions, including those for electrographic papers, are known. In electrographic development processes, a charged latent image is generated directly on the electrographic paper. A toner carrying a charge opposite in polarity to that of the latent image is contacted with the paper and deposits on the charged area as a visible image. Further details regarding electrographic imaging processes are disclosed in, for example, U.S. Pat. Nos. 4,731,622; 4,485,982; 4,569,584; 3,611,419; 4,240,084; 3,564,556; 3,937,177; 3,729,123 and 3,859,960, the disclosures of each of which are totally incorporated herein by reference.

One example of a conductive coating composition is disclosed in U.S. Pat. No. 3,813,264, the disclosure of which is totally incorporated herein by reference. This patent discloses an electroconductive paper containing an N-(alkyl ammonium) acrylamide polymer. In addition, U.S. Pat. No. 3,835,102, the discloses of which is totally incorporated herein by reference, discloses a high polymer composition comprising a salt constituted from an integral type of polycationic polymer containing in its principal repeating unit quaternized nitrogen atoms and aromatic groups, an anion radical of a tetracyano compound, and a neutral tetracyano compound in appropriate amounts such that the electroconductivity is greater than $10^{-5}$ mho/cm. Further, U.S. Pat. No. 3,971,680, the disclosure of which is totally incorporated herein by reference, discloses an electroconductive paper comprising a substrate containing an effective amount of an electroconductive water soluble quaternary ammonium polymer. The polymer is prepared by reacting substantially stoichiometric amounts of at least one aromatic ditertiary amine and one or more anions containing organic compound.

Additionally, U.S. Pat. No. 3,663,461, the disclosure of which is totally incorporated herein by reference, discloses water soluble polyether polyelectrolyte salts containing quaternary nitrogen atoms in the polymer backbone and chain extended by ether groups. The polymers are prepared by treating the polymeric reaction product from an N,N,N',N'-tetraalkylhydroxy substituted diamine and an organic dihalide such as a dihaloalkane or a dihalo ether with an epoxyhaloalkane. Further, U.S. Pat. No. 3,642,663, the disclosure of which is totally incorporated herein by reference, discloses a polar solvent soluble electroconductive quaternized condensation product provided by reacting an alkylene polyamine, a polyalkylenepolyamine, or mixtures thereof with an epihalohydrin in a polar solvent to such an extent that there is little or no crosslinking in the condensation product and by quaternizing the condensation product with a quaternizing agent. In addition, U.S. Pat. No. 3,784,529, the disclosure of which is totally incorporated herein by reference, discloses polymeric quaternary compounds wherein the quaternized atoms are in the polymer chain backbone.

Electrographic papers typically are constructed with a base paper coated with layers of dielectric coating and conductive coating. The dielectric coating generally comprises a resistive resin binder, pigments, and additives, such as dispersing agents, lubricants, optical brighteners, plasticizers, and the like. The conductive coating typically contains conductive polymers, pigments, and additives, such as water-soluble resins, latices, dispersing agents, salts, humectants, optical brighteners, and the like. Generally, more than one coating is applied to the base paper. For example, a conductive coating is typically first coated on one surface of the base paper, followed by a dielectric coating on top of the conductive coating, and subsequently by another conductive coating on the other surface of the base paper.

The conductive polymers typically used in conductive paper coatings are generally water-soluble polyelectrolytes, which are hygroscopic and absorb considerable amounts of moisture. In the presence of water or moisture, the electrolyte polymers dissociate into ions carrying electrical charges and are electrically conductive. Because of the ionic characteristics of these materials, the conductivity of the polymer is a function of the moisture content, which, in turn, depends on the relative humidity conditions of the environment. At high relative humidity, the polymers are more conductive than they are at low relative humidity. Accordingly, with electroconductive papers coated with these polymers, a range or "window" of relative humidity values exists in which the electrographic process can best operate. This range typically is from about 35 percent relative humidity to about 65 percent relative humidity. At conditions lower than about 35 percent relative humidity, the conductivity of the conductive coating generally is inadequate, and the prints obtained generally exhibit low optical density and striation (vertical variations in print density in solid print areas).

In addition, papers coated with typically used conductive polymers tend to exhibit curling. Coatings containing polyelectrolyte conductive polymers tend to be dimensionally unstable as a result of their hygroscopic properties. Under high humidity conditions, the polymer absorbs more moisture and the coating tends to stretch. When the humidity is low, the polymer absorbs less moisture and the coating tends to contract. Unlike the conductive coating, the dielectric coating is relatively stable in dimension and does not stretch or contract under varying humidity conditions. The difference in humidity response between the conductive coating and the dielectric coating, therefore, contributes to the paper curling often observed with conventional electrographic papers.

A further shortcoming of papers coated with conventional polyelectrolyte conductive coatings is the high rigidity of the polymer at low relative humidity. The ability of an electrographic paper coated with these materials to conform itself to an electrographic writing head is negatively affected when the paper is too rigid. Because of poor flexibility of a rigid paper, the prints obtained often exhibit image breakup and line dropout.

In view of the shortcomings of conventional conductive coatings, a need exists for conductive coating compositions that result in minimal curling tendencies when coated onto paper. In addition, a need exists for conductive coating compositions for electrographic papers wherein the paper requires only two coatings, a dielectric coating on one surface and a conductive coating on the opposite surface. Further, there is a need for conductive coating compositions that enable electrographic papers suitable for use under a wide range of relative humidity conditions. Additionally, there is a need for conductive coating compositions that enable flexible electrographic papers which alleviate image breakup and line dropout, especially under low relative humidity conditions. There is a further need for electrographic papers suitable for use under low relative humidity conditions. In addition, a need exists for electrographic papers having a single conductive coating. A need also exists for electrographic papers that enable the generation of uniform, high density, and high quality electrographic images.

SUMMARY OF THE INVENTION

It is an object of the present invention to provide conductive coating compositions that result in minimal curling tendencies when coated onto paper.

It is another object of the present invention to provide conductive coating compositions for electrographic papers wherein the paper requires only two coatings, a dielectric coating on one surface and a conductive coating on the opposite surface.

It is yet another object of the present invention to provide conductive coating compositions that enable electrographic papers suitable for use under a wide range of relative humidity conditions.

It is still another object of the present invention to provide conductive coating compositions that enable flexible electrographic papers which alleviate image breakup and line dropout, especially under low relative humidity conditions.

Another object of the present invention is to provide electrographic papers suitable for use under low relative humidity conditions.

Yet another object of the present invention is to provide electrographic papers having a single conductive coating.

Still another object of the present invention is to provide electrographic papers that enable the generation of high quality electrographic images.

These and other objects of the present invention are achieved by providing a conductive coating composition comprising from 0 to about 95 percent by weight of a pigment, from 0 to about 95 percent by weight of a binder resin, and from about 1 to about 99 percent by weight of a diquaternary ammonium compound of the formula

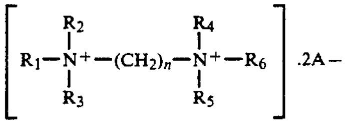

wherein $R_1$ is an alkyl group or alkylene group having from about 12 to about 22 carbon atoms, $R_2$, $R_3$, $R_4$, $R_5$, and $R_6$ are independently selected from the group consisting of alkyl groups and aryl groups having from 1 to about 8 carbon atoms, n is a number of from 1 to about 5, and A is an anion. Another embodiment of the present invention is directed to an electrographic paper which comprises a base sheet coated on one surface with a composition comprising a diquaternary ammonium compound of the above formula and on the opposite surface with a dielectric coating composition. Yet another embodiment of the present invention is directed to an electrographic imaging process which comprises (a) providing an electrographic paper comprising a base sheet coated on one surface with a dielectric coating and on the opposite surface with a conductive coating which comprises a diquaternary ammonium compound of the above formula; (b) generating an electrostatic latent image on the paper with an electrographic writing means; and (c) developing the latent image.

The conductive coating compositions of the present invention contain a diquaternary ammonium compound of the formula shown herein. The anion A can be any suitable anion, preferably one that is not toxic. Examples of suitable anions include halides, such as chloride, fluoride, bromide, iodide, nitrate, sulfonate, sulfate, chlorate, bromate, iodate, phosphate, chromate, toluene sulfonate, methyl sulfate, and the like as well as mixtures thereof. The diquaternary ammonium compound is present in the coating composition of the present invention in an effective amount. Although the coating can consist entirely of the diquaternary ammonium compound, the diquaternary compound generally is present in the coating composition in an amount of from about 1 to about 99 percent by weight, and preferably from about 5 to about 50 percent by weight, of the solids content of the coating. While not being limited to any theory, it is believed that the diquaternary ammonium compound contributes to increased conductivity of the coating composition, and that as a result, electrographic papers coated with the coatings of the present invention exhibit the advantages disclosed herein, including improved performance under a wide range of humidity conditions. For example, an electrographic paper coated with a coating composition containing a diquaternary ammonium compound as specified herein can form excellent quality images over a relative humidity range of about 15 percent higher relative humidity and 15 percent lower relative humidity than an electrographic paper coated with the same coating composition but not containing a diquaternary ammonium compound as specified herein; thus, if the coated paper not containing a diquaternary ammonium compound can be imaged at relative humidities of from about 40 to about 60 percent, the same paper with the same coating composition containing a diquaternary ammonium compound can often be imaged at relative humidities of 25 percent or less to 75 percent or more.

In addition to the diquaternary ammonium compound, the conductive coating compositions of the present invention can contain pigments. Any suitable pigment can be employed. Examples of suitable pigments include clay, calcium carbonate, titanium dioxide, zinc oxide, talc, barium sulfate, silica, silicate, diatomaceous calcite, alumina trihydrate, synthetic polymers, and the like as well as mixtures thereof. The pigment, when present, is present in the coating in an effective amount, generally from about 5 to about 95 percent by weight, and preferably from about 25 to about 75 percent by weight of the solids content of the coating.

Further, the coating compositions of the present invention can contain binder resins. Any suitable water soluble resin can be employed, including cationic or nonionic resins. Examples of suitable resins include poly(dimethyl diallyl ammonium chloride), poly(vinyl benzyl trimethyl ammonium chloride), poly{1,2-ethanediammonium, N-[(ethenylphenyl)methyl]-N,N,N',N',N'-pentamethyl dichloride}, polydextrose, poly(vinyl pyrrolidone), poly(vinyl alcohol), hydroxyethyl cellulose, modified starch, urea-formaldehyde resin, styrene-maleic anhydride copolymer, and the like, as well as mixtures thereof. When present, the resin is present in an effective amount, generally from about 5 to about 95 percent by weight, and preferably from about 25 to about 75 percent by weight of the solids content of the coating. Latices can also be employed as the binder, including non-ionic latices such as emulsions of vinyl acetateethylene copolymers, vinyl acetate polymers, acrylic polymers, vinyl acetateacrylic copolymers, styrene-butadiene copolymers, and the like as well as mixtures thereof. When present, the latex is present in an effective amount, generally from about 10 to about 50 percent by weight, and preferably from about 15 to about 35 percent by weight of the solids content of the coating.

Generally, the coatings of the present invention can be prepared by adding the solid coating components to water to form a slurry and mixing the components at ambient temperatures by any suitable method, such as milling, mixing in a high speed blender, or the like. The solution mixture thus obtained is then coated onto the desired substrate, such as a base paper sheet, by any suitable method, such as wire rod coating, blade coating, air knife coating, roll coating, or the like. The coating mixture can contain any suitable and effective solids concentration; typical solids concentrations are from about 20 to about 70 percent by weight solids. Subsequent to coating, the substrate is dried to obtain a substrate coated with the conductive coating composition of the present invention. Drying can be by exposure to air, and can be hastened by application of heat. When applied to an electrographic paper, the coating compositions of the present invention are applied in an effective coating weight, generally from about 1 pound per ream to about 5 pounds per ream, wherein a ream represents 3000 square feet, or from about 1 to about 9 grams per square meter, although the coating weight can be outside of this range.

When the coatings of the present invention are employed to prepare an electrographic paper suitable for electrographic printing processes, the base paper generally is coated on one surface with the conductive coating composition of the present invention and on the other surface with a dielectric coating composition. The coating applied first generally penetrates the base paper to a greater extent than the later applied coating. For electrographic papers of the present invention, it is preferred to coat the base paper first with the dielectric coating and second with the conductive coating, although this order may be reversed if so desired. The dielectric coating can be any suitable dielectric coating typically employed for preparing electrographic papers. An example of a suitable dielectric coating composition generally comprises a resistive resin binder, a pigment, and, optionally, dispersing agents, lubricants, optical brighteners, plasticizers, and the like. Examples of suitable resistive resin binders include vinyl resins, acrylic resins, styrene-butadiene resins, polyester resins, and the like, as well as mixtures thereof. Resistive resin binders are present in the dielectric coatings in effective amounts, generally from about 10 to about 90 percent by weight, and preferably from about 30 to about 70 percent by weight of the dry coating. Examples of suitable pigments include clay, calcium carbonate, titanium dioxide, zinc oxide, talc, barium sulfate, silica, silicate, diatomaceous calcite, alumina trihydrate, synthetic polymers, and the like as well as mixtures thereof. Pigments are present in the dielectric coatings in effective amounts, generally from about 5 to about 95 percent by weight, and preferably from about 25 to about 75 percent by weight of the dry coating. Optional ingredients include dispersing agents, lubricants, optical brighteners, and plasticizers. Examples of suitable dispersing agents include lecithins, alkylated poly(vinyl pyrrolidones), organic phosphate esters, long chain hydroxyethyl imidazolines, and the like, as well as mixtures thereof. Dispersing agents can be present in the dielectric coatings in effective amounts, generally from about 0.2 to about 5.0 percent by weight of the total amount of pigment present in the coating mixture and preferably from about 0.5 to about 1.0 percent by weight of the total amount of pigment present in the coating mixture. Examples of suitable lubricants include beeswax, polyethylene wax, polypropylene wax, stearic acid, metallic stearates, and the like, as well as mixtures thereof. Lubricants can be present in the dielectric coatings in effective amounts, generally from about 0.01 to about 10 percent by weight of the dry coating, and preferably from about 2 to about 6 percent by weight of the dry coating. Examples of suitable optical brighteners include stilbene, coumarin, oxazole derivatives, and the like, as well as mixtures thereof. Optical brighteners can be present in the dielectric coatings in effective amounts, generally from about 0.1 to about 1.0 percent by weight of the dry coating, and preferably from about 0.2 to about 0.6 percent by weight of the dry coating. Examples of suitable plasticizers include dibutyl phthalate, dioctyl phthalate, tricresyl phosphate, chlorinated polyethylenes, and the like, as well as mixtures thereof. Plasticizers can present in the dielectric coatings in effective amounts, generally from about 0.01 to about 10 percent by weight of the dry coating, and preferably from about 0.01 to about 5 percent by weight of the dry coating. The dielectric coating is coated onto the electrographic paper in an effective coating weight, generally from about 2 to about 8 pounds per ream, wherein a ream represents 3,000 square feet, or from about 3 to about 14 grams per square meter, although the coating weight can be outside of this range. This coating can be applied by any suitable technique, such as those mentioned herein for coating the conductive layer onto the base sheet.

The base sheet employed for electrographic papers of the present invention can be any paper or paper stock, preferably with a thickness of from about 2.0 to about 5.0 mils and preferably not previously coated with a resin.

Electrographic papers of the present invention generally comprise a base sheet coated on one side with a conductive coating and on the other side with a dielectric coating. While not being limited to any theory, it is believed that unlike many known conductive paper coatings, the conductive coatings of the present invention penetrate into the paper very well, thereby enhancing the conductivity of the base sheet and alleviating the need for a second conductive coating between the dielectric coating and the base sheet. If desired, however, electrographic papers of the present invention can also contain a second conductive layer situated between the base sheet and the dielectric coating to increase the conductivity of the paper. The two conductive coatings and the dielectric coating can be applied in any desired order; one preferred coating order with papers of the present invention is first to coat the base sheet with a conductive layer, followed by coating the dielectric layer onto the conductive layer, and subsequently coating the opposite surface of the base sheet with the second conductive layer. When electrographic papers of the present invention possess two conductive layers, the dielectric layer typically has a coating weight of from about 2 to about 8 pounds per ream (3,000 square feet) or from about 3 to about 14 grams per square meter, and the total coating weight of the conductive layers, obtained by adding the coating weight of the conductive layer situated between the dielectric layer and the base sheet and the coating weight of the conductive layer situated on the opposite surface of the base sheet, is typically from about 2 to about 8 pounds per ream (3,000 square feet) or from about 3 to about 14 grams per square meter, although these coating weights may be outside of the stated ranges.

Electrographic papers of the present invention can be employed in electrographic imaging processes. The imaging processes of the present invention comprise (a) providing an electrographic paper comprising a base sheet coated on one surface with a dielectric coating and on the other surface with a conductive coating which comprises a diquaternary ammonium compound of the formula

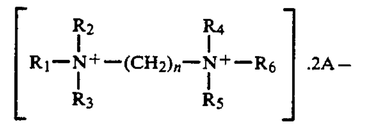

wherein $R_1$ is an alkyl group or alkylene group having from about 12 to about 22 carbon atoms, $R_2$, $R_3$, $R_4$, $R_5$, and $R_6$ are independently selected from the group consisting of alkyl groups and aryl groups having from 1 to about 8 carbon atoms, n is a number of from 1 to about 5, and A is an anion; (b) generating an electrostatic latent image on the paper with an electrographic writing means; and (c) developing the latent image. Optionally, if desired the developed image can be affixed to the paper by any suitable means, such as by application of heat, pressure, solvent, vapor, and the like as well as any mixture thereof.

Any conventional dry or liquid developer can be employed to develop the latent image on the paper. Suitable dry developers include both single component developers and two-component developers. Two-component developers comprise toner particles and carrier particles. Typical toner particles can be of any composition suitable for development of electrostatic latent images, such as those comprising a resin and a colorant. Typical toner resins include polyesters, polyamides, epoxies, polyurethanes, diolefins, vinyl resins and polymeric esterification products of a dicarboxylic acid and a diol comprising a diphenol. Examples of vinyl monomers include styrene, p-chlorostyrene, vinyl naphthalene, unsaturated mono-olefins such as ethylene, propylene, butylene, isobutylene and the like; vinyl halides such as vinyl chloride, vinyl bromide, vinyl fluoride, vinyl acetate, vinyl propionate, vinyl benzoate, and vinyl butyrate; vinyl esters such as esters of monocarboxylic acids, including methyl acrylate, ethyl acrylate, n-butylacrylate, isobutyl acrylate, dodecyl acrylate, n-octyl acrylate, 2-chloroethyl acrylate, phenyl acrylate, methylalpha-chloroacrylate, methyl methacrylate, ethyl methacrylate, butyl methacrylate, and the like; acrylonitrile, methacrylonitrile, acrylamide, vinyl ethers, including vinyl methyl ether, vinyl isobutyl ether, and vinyl ethyl ether; vinyl ketones such as vinyl methyl ketone, vinyl hexyl ketone, and methyl isopropenyl ketone; N-vinyl indole and N-vinyl pyrrolidone; styrene-butadienes; mixtures of these monomers; and the like. The resins are generally present in an amount of from about 30 to about 99 percent by weight of the toner composition, although they can be present in greater or lesser amounts, provided that the objectives of the invention are achieved.

Any suitable pigments or dyes or mixture thereof can be employed in the toner particles. Typical pigments or dyes include carbon black, nigrosine dye, aniline blue, magnetites, and mixtures thereof, with carbon black being a preferred colorant. The pigment is preferably present in an amount sufficient to render the toner composition highly colored to permit the formation of a clearly visible image on a recording member. Generally, the pigment particles are present in amounts of from about 1 percent by weight to about 20 percent by weight based on the total weight of the toner composition; however, lesser or greater amounts of pigment particles can be present provided that the objectives of the present invention are achieved.

Other colored toner pigments include red, green, blue, brown, magenta, cyan, and yellow particles, as well as mixtures thereof. Illustrative examples of suitable magenta pigments include 2,9-dimethyl-substituted quinacridone and anthraquinone dye, identified in the Color Index as Cl 60710, Cl Dispersed Red 15, a diazo dye identified in the Color Index as Cl 26050, Cl Solvent Red 19, and the like. Illustrative examples of suitable cyan pigments include copper tetra-4-(octadecyl sulfonamido) phthalocyanine, X-copper phthalocyanine pigment, listed in the Color Index as Cl 74160, Cl Pigment Blue, and Anthradanthrene Blue, identified in the Color Index as Cl 69810, Special Blue X-2137, and the like. Illustrative examples of yellow pigments that can be selected include diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy aceto-acetanilide, Permanent Yellow FGL, and the like. These color pigments are generally present in an amount of from about 15 weight percent to about 20 weight percent based on the weight of the toner resin particles, although lesser or greater amounts can be present provided that the objectives of the present invention are met.

When the pigment particles are magnetites, which comprise a mixture of iron oxides ($Fe_3O_4$) such as those commercially available as Mapico Black, these pigments are present in the toner composition in an amount of from about 10 percent by weight to about 70 percent by weight, and preferably in an amount of from about 20 percent by weight to about 50 percent by weight, although they can be present in greater or lesser amounts, provided that the objectives of the invention are achieved.

The toner compositions can be prepared by any suitable method. For example, the components of the dry toner particles can be mixed in a ball mill, to which steel beads for agitation are added in an amount of approximately five times the weight of the toner. The ball mill can be operated at about 120 feet per minute for about 30 minutes, after which time the steel beads are removed. Dry toner particles for two-component developers generally have an average particle size between about 6 micrometers and about 20 micrometers.

Any suitable external additives can also be utilized with the dry toner particles. The amounts of external additives are measured in terms of percentage by weight of the toner composition, but are not themselves included when calculating the percentage composition of the toner. For example, a toner composition containing a resin, a pigment, and an external additive can comprise 80 percent by weight resin and 20 percent by weight pigment; the amount of external additive present is reported in terms of its percent by weight of the combined resin and pigment. External additives can include any additives suitable for use in electrostatographic toners, including straight silica, colloidal silica (e.g. Aerosil R972®, available from Degussa, Inc.), ferric oxide, long chain alcohols, polypropylene waxes, polymethylmethacrylate, zinc stearate, chromium oxide, aluminum oxide, stearic acid, polyvinylidene fluoride (e.g. Kynar®, available from Pennwalt Chemicals Corporation), and the like. External additives can be present in any suitable amount provided that the objectives of the present invention are achieved.

Any suitable carrier particles can be employed with the toner particles. Typical carrier particles include granular zircon, steel, nickel, iron ferrites, and the like. Other typical carrier particles include nickel berry carriers as disclosed in U.S. Pat. No. 3,847,604, the entire disclosure of which is incorporated herein by reference. These carriers comprise nodular carrier beads of nickel characterized by surfaces of reoccurring recesses and protrusions that provide the particles with a relatively large external area. The diameters of the carrier particles can vary, but are generally from about 50 microns to about 1,000 microns, thus allowing the particles to possess sufficient density and inertia to avoid adherence to the electrostatic images during the development process. Carrier particles can possess coated surfaces. Typical coating materials include polymers and terpolymers, including, for example, fluoropolymers such as polyvinylidene fluorides as disclosed in U.S. Pat. Nos. 3,526,533; 3,849,186 and 3,942,979, the disclosures of each of which are totally incorporated herein by reference. The toner may be present, for example, in the two-component developer in an amount equal to about 1 to about 5 percent by weight of the carrier, and preferably is equal to about 3 percent by weight of the carrier.

Typical dry toners are disclosed, for example, in U.S. Pat. Nos. 2,788,288; 3,079,342; and U.S. Pat. No. Re. 25,136, the disclosures of each of which are totally incorporated herein by reference.

If desired, development can be performed with liquid developers. Liquid developers are disclosed in, for example, U.S. Pat. Nos. 2,890,174; 2,899,335; 4,804,601; 4,476,210; 2,877,133; 2,892,709; 2,913,353; 3,729,419; 3,841,893; 3,968,044; 4,794,651; 4,762,764; 4,830,945; 3,976,808; 3,084,043; 4,047,943; 4,059,444; 4,822,710; 4,804,601; 4,766,049; 4,686,936 and 4,764,446, the disclosures of each of which are totally incorporated herein by reference. Liquid developers can comprise aqueous based or oil based inks, and include both inks containing a water or oil soluble dye substance and pigmented inks. Typical dye substances are Methylene Blue, commercially available from Eastman Kodak Company, Brilliant Yellow, commercially available from the Harlaco Chemical Company, potassium permanganate, ferric chloride and Methylene Violet, Rose Bengal and Quinoline Yellow, the latter three available from Allied Chemical Company, and the like. Typical pigments are carbon black, graphite, lamp black, bone black, charcoal, titanium dioxide, white lead, zinc oxide, zinc sulfide, iron oxide, chromium oxide, lead chromate, zinc chromate, cadmium yellow, cadmium red, red lead, antimony dioxide, magnesium silicate, calcium carbonate, calcium silicate, phthalocyanines, benzidines, naphthols, toluidines, and the like. The liquid developer composition can comprise a finely divided opaque powder, a high resistance liquid, and an ingredient to prevent agglomeration. Typical high resistance liquids include such organic dielectric liquids as paraffinic hydrocarbons such as the Isopar® and Norpar® family, carbon tetrachloride, kerosene, benzene, trichloroethylene, and the like. Other liquid developer components or additives include vinyl resins, such as carboxy vinyl polymers, polyvinylpyrrolidones, methylvinylether maleic anhydride interpolymers, polyvinyl alcohols, cellulosics such as sodium carboxy-ethylcellulose, hydroxypropylmethyl cellulose, hydroxyethyl cellulose, methyl cellulose, cellulose derivatives such as esters and ethers thereof, alkali soluble proteins, casein, gelatin, and acrylate salts such as ammonium polyacrylate, sodium polyacrylate, polymers such as poly(2-ethyl hexylmethacrylate), poly(isobutylene-co-isoprenes), such as Kalene 800, available from Hardman Company New Jersey, polyvinyl toluene-based copolymers, including vinyl toluene acrylic copolymers such as Pliolite OMS, available from the Goodyear Tire and Rubber Company, block copolymers such as poly(styrene-b-hydrogenated butadiene), including Kraton G 1701, available from Shell Chemical Company, ethylene-vinyl acetate copolymers such as the Elvax® I resins available from E.I. Du Pont de Nemours & Company, copolymers of ethylene and an $\alpha,\beta$-ethylenically unsaturated acid selected from acrylic or methacrylic acid, where the acid moiety is present in an amount of from 0.1 to 20 percent by weight, such as the Elvax® II resins available from E.I. Du Pont de Nemours & Company, polybutyl terephthalates, ethylene ethyl acrylate copolymers such as those available as Bakelite DPD 6169, DPDA 6182 Natural, and DTDA 9169 Natural from Union Carbide Company, ethylene vinyl acetate resins such as DQDA 6479 Natural 7 and DQDA 6832 Natural 7 available from Union Carbide Company, methacrylate resins such as polybutyl methacrylate, polyethyl methacrylate, and polymethyl methacrylate, available under the tradename Elvacite from E.I. Du Pont de Nemours & Company, polyolefins and halogenated polyolefins, such as chlorinated polypropylenes and poly-α-olefins, including polyhexadecenes and polyoctadecenes, and the like, as well as mixtures thereof. Liquid developers can also contain charge control additives, such as the lithium, cadmium, calcium, manganese, magnesium and zinc salts of heptanoic acid; the barium, aluminum, cobalt, manganese, zinc, cerium and zirconium salts of 2-ethyl hexanoic acid, (these are known as metal octoates); the barium, aluminum, zinc, copper, lead and iron salts of stearic acid; the calcium, copper, manganese, nickel, zinc and iron salts of naphthenic acid; and ammonium lauryl sulfate, sodium dihexyl sulfosuccinate, sodium dioctyl sulfosuccinate, aluminum diisopropyl salicylate, aluminum dresinate, aluminum salt of 3,5 di-t-butyl gamma resorcylic acid. Mixtures of these materials may also be used. Particularly preferred charge control agents include lecithin (Fisher Inc.); OLOA 1200, a polyisobutylene succinimide available from Chevron Chemical Company; basic barium petronate (Witco Inc.); zirconium octoate (Nuodex); aluminum stearate; salts of calcium, manganese, magnesium and zinc with heptanoic acid; salts of barium, aluminum, cobalt, manganese, zinc, cerium, and zirconium octoates; salts of barium, aluminum, zinc, copper, lead, and iron with stearic acid; iron naphthenate; and the like, as well as mixtures thereof. The charge control additive may be present in an amount of from about 0.001 to about 3 percent by weight, and preferably from about 0.01 to about 0.8 percent by weight of the developer.

Any suitable conventional development technique can be utilized to deposit toner particles on the electrostatic latent image. Well known electrophotographic development techniques include magnetic brush development, cascade development, powder cloud development, electrophoretic development, and the like. Magnetic brush development is more fully described, for example, in U.S. Pat. No. 2,791,949, the disclosure of which is totally incorporated herein by reference, cascade development is more fully described, for example, in U.S. Pat. Nos. 2,618,551 and 2,618,552, the disclosures of each of which are totally incorporated herein by reference, powder cloud development is more fully described, for example, in U.S. Pat. Nos. 2,725,305; 2,918,910 and 3,015,305, the disclosures of each of which are totally incorporated herein by reference, and liquid development is more fully described, for example, in U.S. Pat. No. 3,084,043, the disclosure of which is totally incorporated herein by reference.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

A sheet of paper (FPC Paper, available from Johnson Matthey Corporation) was coated with a #3 wire-wound rod with N,N,N',N',N'-pentamethyl-N-tallow-1,3-propanediammonium dichloride obtained from Akzo Chemie America. N,N,N',N',N'-pentamethyl-N-tallow-1,3-propanediammonium dichloride is a diquaternary ammonium compound of the following formula:

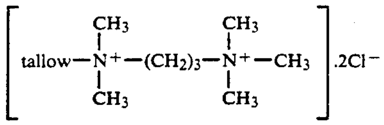

The term "tallow" refers to a mixture of hydrocarbons with from about 14 to about 22 carbon atoms; thus, the diquaternary ammonium compound comprises a mixture of materials with "tallow" groups having from about 14 to about 22 carbon atoms. The particular compound employed in this instance, Duoquad T-50, available from Akzo Chemie America Company, was a mixture which contained 3 percent of the above molecule with a tetradecyl (14 carbon atoms) group, 29 percent of the above molecule with a hexadecyl (16 carbon atoms) group, 25 percent of the above molecule with an octadecyl (18 carbon atoms) group, and 43 percent of the above molecule with an octadecenyl or octadecadienyl (18 carbon atoms) group. The coating weight was 3 pounds per ream (3,000 square feet). The surface resistivity of the coated paper was then measured at various relative humidities with the following results:

| Relative Humidity | Resistivity (mega-ohms) |
|---|---|
| 71% | 0.11 |
| 50% | 0.34 |
| 43% | 0.35-0.40 |
| 24% | 2.5 |

These results indicate that papers coated with a diquaternary ammonium compound are suitable for generating electrographic images over a wide range of relative humidities.

EXAMPLE II

Three conductive coating compositions were prepared as follows. A first coating mixture (Coating A) was prepared by milling in a high shear mixer for about 30 minutes a mixture of water and a coating composition present in the water in an amount of about 38 percent by weight solids. The solid portion of the coating composition comprised 50 percent by weight of pigments (45 percent by weight of calcium carbonate pigment (Atomite, manufactured by Thompson, Weinman & Company), 5 percent titanium dioxide pigment (Titanox 1000, manufactured by NL Industries)) and 50 percent by weight of an electroconductive polymer of 1,2-ethanediammonium, N-[(ethenyl-phenyl) methyl]-N,N,N',N',N'-pentamethyl dichloride (Chemistat 6300H, manufactured by Sanyo Chemical Industries, Japan). Coating A contained no diquaternary ammonium compound of the present invention, and functioned as a control.

Second and third coating mixtures (Coating B and Coating C) were prepared by the same process, with the exception that the solid portion of Coating B contained 50 percent by weight of the pigments as indicated above, 40 percent by weight of the electroconductive polymer of 1,2-ethanediammonium, N-[(ethenyl-phenyl) methyl]-N,N,N',N',N'-pentamethyl dichloride, and 10 percent by weight of N,N,N',N',N'-pentamethyl-N-tallow-1,3-propanediammonium dichloride (Akzo Chemie America), and the solid portion of Coating C contained 50 percent by weight of the pigment mixture as indicated above, 35 percent by weight of the electroconductive polymer of 1,2-ethanediammonium, N-[(ethenyl-phenyl) methyl]-N,N,N',N',N'-pentamethyl dichloride, and 15 percent by weight of N,N,N',N',N'-pentamethyl-N-tallow-1,3-propanediammonium dichloride (Akzo Chemie America).

A separate dielectric coating mixture (Coating M) was prepared by milling in a high shear mixer for about 30 minutes a mixture of toluene and a coating composition present in the toluene in an amount of about 35 percent by weight solids. The solids portion contained 45 percent by weight calcium carbonate pigment (Atomite, available from Thompson, Weinman & Company), 5 percent by weight titanium dioxide pigment (Titanox 2030, available from NL Industries), and 50 percent by weight of an acrylic resin (Electrographic Resin E-342, available from De Soto, Inc.).

Base paper sheets with a thickness of about 0.068 millimeters and available from James River Corporation as FPC paper were then coated with dielectric Coating M on one surface by a wire-wound rod coating process. The dry coating weight for the dielectric layer was about 13±1 grams per square meter. Subsequently, three of the base papers were coated on the opposite surface; paper 1 was coated with Coating A, paper 2 was coated with Coating B, and paper 3 was coated with Coating C by a wire-wound rod coating process. The dry coating weight for the conductive layers was about 6.0±0.5 grams per square meter.

The coated papers were first conditioned by exposure to 50 percent relative humidity for 24 hours and were then tested in a Versatec® 8200 plotter suitable for preparing black and white images at a relative humidity of about 50 percent. The images generated and developed on paper coated with Coating A, which contained no diquaternary ammonium compound, exhibited poor and blotchy image quality and low optical density (less than 1.0). In addition, large area image breakup, in which portions of graphic images were missing, and extensive line dropout, in which portions of line images were missing, were observed. In contrast, the images generated and developed on paper coated with Coating B and Coating C, which contained the diquaternary ammonium compound, exhibited uniform and continuous image quality with high optical density of over 1.2. In addition, no image breakup or line dropout were observed. The results are summarized below in Table 1:

TABLE 1

| | Paper 1 | Paper 2 | Paper 3 |
|---|---|---|---|
| Dielectric Coating | M | M | M |
| Conductive Coating | A | B | C |
| Number of Conductive Coatings | 1 | 1 | 1 |
| Percent Diquaternary Ammonium Compound in Coating | 0 | 10 | 15 |
| Image Optical Density | 0.92 | 1.21 | 1.22 |
| Image Uniformity | poor | good | good |

As can be seen from these results, the papers coated with the coating compositions of the present invention, namely those containing a diquaternary ammonium compound, exhibited superior image quality compared to the paper coated with a conductive coating containing no diquaternary ammonium compound.

EXAMPLE III

Three additional electrographic papers were prepared as follows. Three base sheets comprising FPC paper available from James River Corporation were first coated with conductive coatings on one surface in coating weights of about 6.0±0.5 grams per square meter by the process described in Example II; paper 4 was coated with Coating A of Example II, paper 5 was coated with Coating B of Example II, and paper 6 was coated with Coating C of Example II. Subsequently, the conductive coatings of all three sheets were overcoated with dielectric Coating M as described in Example II at a coating weight of about 11±1 grams per square meter by the process described in Example II. Thereafter, a second conductive coating with a coating weight of about 6.0±0.5 grams per square meter was coated onto the opposite surfaces of the base sheets; paper 4 was coated with Coating A of Example II, paper 5 was coated with Coating B of Example II, and paper 6 was coated with Coating C of Example II.

The coated papers thus prepared were first conditioned by exposure to 50 percent relative humidity for 24 hours and then tested in a Versatec® Spectrum full color plotter. Images were generated and developed. Excellent image quality was obtained for all three papers with high image density and vivid colors. The papers were also measured for stiffness and observed for curling at low relative humidity (25 to 30% RH); the paper containing no diquaternary ammonium compound exhibited higher stiffness and a greater degree of paper curl than the papers containing a diquaternary ammonium compound. The results are summarized below in Table 2:

TABLE 2

| | Paper 4 | Paper 5 | Paper 26 |
|---|---|---|---|
| Dielectric Coating | M | M | M |
| Conductive Coating | A | B | C |
| Number of Conductive Coatings | 2 | 2 | 2 |
| Percent Diquaternary Ammonium Compound in Coating | 0 | 10 | 15 |
| Image Optical Density | 1.20 | 1.26 | 1.30 |
| Image Uniformity | good | good | good |
| Stiffness, milligrams (machine direction) | 92 | 86 | 84 |
| Stiffness, milligrams (cross direction) | 60 | 58 | 52 |
| Curling at 25-30% RH | moderate | slight | minimal |

As can be seen from these results, the papers coated with the coating compositions of the present invention, namely those containing a diquaternary ammonium compound, exhibited reduced stiffness and reduced paper curl compared to the paper coated with a conductive coating containing no diquaternary ammonium compound. It is believed that the image uniformity and optical density obtained with paper 4 having Coating A are superior to those obtained in Example II for paper 1 coated with Coating A because paper 4, having two conductive coatings, possessed higher conductivity than paper 1, which had one conductive coating.

EXAMPLE IV

A coated paper (paper 7) was prepared as follows. A dielectric coating composition (Coating N) was prepared by milling in a high shear mixer for about 30 minutes a mixture of toluene and a coating composition present in the toluene in an amount of about 35 percent by weight solids. The solids portion contained 61 percent by weight calcium carbonate pigment (Atomite, available from Thompson, Weinman & Company), 6 percent by weight titanium dioxide pigment (Titanox 2030, available from NL Industries), and 33 percent by weight of an acrylics resin (Electrographic Resin E-342, available from De Soto, Inc.).

A base sheet of FPC paper, available from James River Corporation, was then coated first on one surface with Coating N at a coating weight of about 13±1 grams per square meter by the procedure described in Example II for coating a dielectric coating, followed by coating the opposite surface with Coating C at a coating weight of about 6.0±0.5 grams per square meter by the procedure described in Example II.

The paper thus prepared was first conditioned by exposure to 50 percent relative humidity for 24 hours and then tested in a Versatec® 8200 black and white plotter. Images were generated and developed on the paper. Excellent quality prints similar to those obtained for Paper 3 were obtained; the image optical density was over 1.2, and the image was sharp and continuous without breakup or dropout.

EXAMPLE V

Two conductive coating compositions were prepared as follows. Coating D was prepared by milling in a high shear mixer for about 30 minutes a mixture of water and a coating composition present in the water in an amount of about 38 percent by weight solids. The solid portion of the coating composition comprised 50 percent by weight of pigments (45 percent by weight of calcium carbonate pigment (Atomite, manufactured by Thompson, Weinman & Company), 5 percent titanium dioxide pigment (Titanox 1000, manufactured by NL Industries)), 35 percent by weight of an electroconductive polymer of dimethyl diallyl ammonium chloride (Conductive Polymer 261LV, available from Calgon Corporation), and 15 percent by weight of N,N,N',N',N'-pentamethyl-N-tallow-1,3-propanediammonium dichloride as described in Example II. Coating E was prepared by the same process, with the exception that the solid portion of Coating E contained 55 percent by weight of the pigments (50 percent calcium carbonate and 5 percent titanium dioxide), 25 percent by weight of the electroconductive polymer of dimethyl diallyl ammonium chloride, and 20 percent by weight of N,N,N',N',N'-pentamethyl-N-tallow-1,3-propanediammonium dichloride.

Base paper sheets with a thickness of about 0.068 millimeters (FPC paper available from James River Corporation) were then coated with dielectric coating N on one surface by a wire-wound rod coating process. The dry coating weight for the dielectric layer was about 13±1 grams per square meter. Subsequently, two of the base papers were coated on the opposite surface; paper 8 was coated with Coating D and paper 9 was coated with Coating E by wire-wound rod coating processes. The dry coating weight for the conductive layers was about 6.0±0.5 grams per square meter for paper 8 and about 4.0±0.5 grams per square meter for paper 9.

The coated papers were then incorporated into a Versatec® 8200 plotter suitable for preparing black and white images. The images generated and developed on paper coated with Coating D and Coating E exhibited uniform and continuous image quality with high optical density of over 1.2. In addition, no image breakup or line dropout were observed.

EXAMPLE VI

Two conductive coating compositions were prepared as follows. Coating F was prepared by milling in a high shear mixer for about 30 minutes a mixture of water and a coating composition present in the water in an amount of about 38 percent by weight solids. The solid portion of the coating composition comprised 55 percent by weight of pigments (50 percent calcium carbonate and 5 percent titanium dioxide), 25 percent by weight of an electroconductive polymer of 1,2-ethanediammonium, N-[(ethenyl-phenyl) methyl]-N,N,N',N',N'-pentamethyl dichloride as described in Example II, and 20 percent by weight of N,N,N',N',N'-pentamethyl-N-tallow-1,3-propanediammonium dichloride as described in Example II. Coating G was prepared by the same process, with the exception that the solid portion of Coating G contained 55 percent by weight of the pigments (50 percent by weight calcium carbonate and 5 percent by weight titanium dioxide), 35 percent by weight of the electroconductive polymer of 1,2-ethanediammonium, N-[(ethenyl-phenyl) methyl]-N,N,N',N',N'-pentamethyl dichloride, 5 percent by weight of N,N,N',N',N'-pentamethyl-N-tallow-1,3-propanediammonium dichloride, and 5 percent by weight of ammonium chloride.

Base paper sheets with a thickness of about 0.068 millimeter (FPC paper available from James River Corporation) were then coated with dielectric Coating M on one surface by a wire-wound rod coating process. The dry coating weight for the dielectric layer was about 12±1 grams per square meter. Subsequently, two of the base papers were coated on the opposite surface; paper 10 was coated with Coating F and paper 11 was coated with Coating G by a wire-wound rod coating process. The dry coating weight for the conductive layers was about 5.0±0.5 grams per square meter for paper 10 and about 6.0±0.5 grams per square meter for paper 11.

The coated papers were then incorporated into a Versatec® 8200 plotter suitable for preparing black and white images. The images generated and developed on paper coated with Coating D and Coating E exhibited uniform and continuous image quality with high optical density of over 1.2. In addition, no image breakup or line dropout were observed.

The papers were also incorporated into a Versatec® Spectrum color plotter and images were generated and developed. Excellent image quality was obtained for both papers with high image density and vivid colors.

Other embodiments and modifications of the present invention may occur to those skilled in the art subsequent to a review of the information presented herein; these embodiments and modifications, as well as equivalents thereof, are also included within the scope of this invention.

What is claimed is:

1. An electrographic paper which comprises a base sheet coated on one surface with a dielectric coating composition and on its opposite surface with a conductive coating composition comprising a diquaternary ammonium compound of the formula

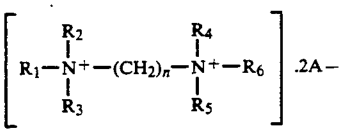

wherein $R_1$ is an alkyl group or alkylene group having from about 12 to about 22 carbon atoms, $R_2$, $R_3$, $R_4$, $R_5$, and $R_6$ are independently selected from the group consisting of alkyl groups and aryl groups having from 1 to about 8 carbon atoms, n is a number of from 1 to about 5, and A is an anion.

2. An electrographic paper according to claim 1 wherein an additional conductive coating is present between the base sheet and the dielectric coating.

3. An electrographic paper according to claim 1 wherein the anion is selected from the group consisting of chloride, fluoride, bromide, iodide, nitrate, sulfonate, sulfate, chlorate, bromate, iodate, phosphate, chromate, toluene sulfonate, methyl sulfate, and mixtures thereof.

4. An electrographic paper according to claim 1 wherein the diquaternary ammonium compound is present in an amount of from about 1 to about 99 percent by weight of the conductive coating composition.

5. An electrographic paper according to claim 1 wherein the diquaternary ammonium compound is present in an amount of from about 5 to about 50 percent by weight of the conductive coating composition.

6. An electrographic paper according to claim 1 wherein the conductive coating contains a pigment.

7. An electrographic paper according to claim 6 wherein the pigment is selected from the group consisting of clay, calcium carbonate, titanium dioxide, zinc oxide, talc, barium sulfate, silica, silicate, diatomaceous calcite, alumina trihydrate, and mixtures thereof.

8. An electrographic paper according to claim 6 wherein the pigment is present in an amount of from about 5 to about 95 percent by weight of the conductive coating composition.

9. An electrographic paper according to claim 6 wherein the pigment is present in an amount of from about 25 to about 75 percent by weight of the conductive coating composition.

10. An electrographic paper according to claim 1 wherein the conductive coating contains a binder resin.

11. An electrographic paper according to claim 10 wherein the binder resin is selected from the group consisting of poly(dimethyl diallyl ammonium chloride), poly(vinyl benzyl trimethyl ammonium chloride), poly{1,2-ethanediammonium, N-[(ethenyl-phenyl)methyl]-N,N,N',N',N'-pentamethyl dichloride}, polydextrose, poly(vinyl pyrrolidone), poly(vinyl alcohol), hydroxyethyl cellulose, modified starch, urea-formaldehyde resin, styrene-maleic anhydride copolymer, vinyl acetate-ethylene copolymers, vinyl acetate polymers, acrylic polymers, vinyl acetate-acrylic copolymers, styrene-butadiene copolymers, and mixtures thereof.

12. An electrographic paper according to claim 10 wherein the binder resin is present in an amount of from about 5 to about 95 percent by weight of the conductive coating composition.

13. An electrographic paper according to claim 10 wherein the binder resin is present in an amount of from about 25 to about 75 percent by weight of the conductive coating composition.

14. An electrographic paper according to claim 1 wherein the conductive coating has a coating weight of from about 1 to about 9 grams per square meter.

15. An electrographic paper according to claim 2 wherein the total coating weight of the conductive coatings is from about 3 to about 14 grams per square meter.

16. An electrographic paper according to claim 1 wherein the dielectric coating has a coating weight of from about 3 to about 14 grams per square meter.

17. An electrographic paper according to claim 1 wherein the base sheet has a thickness of from about 2 to about 5 mils.

18. An electrographic imaging process which comprises (a) providing an electrographic paper comprising a base sheet coated on one surface with a dielectric coating composition and on its opposite surface with a conductive coating composition which comprises a diquaternary ammonium compound of the formula

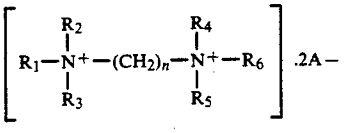

wherein $R_1$ is an alkyl group or alkylene group having from about 12 to about 22 carbon atoms, $R_2$, $R_3$, $R_4$, $R_5$, and $R_6$ are independently selected from the group consisting of alkyl groups and aryl groups having from 1 to about 8 carbon atoms, n is a number of from 1 to about 5, and A is an anion; (b) generating an electrostatic latent image on the paper with an electrographic writing means; and (c) developing the latent image.

19. A process according to claim 18 wherein an additional conductive coating is present between the base sheet and the dielectric coating.

20. A process according to claim 18 wherein the diquaternary ammonium compound is present in an amount of from about 1 to about 99 percent by weight of the conductive coating composition.

21. A process according to claim 18 wherein the diquaternary ammonium compound is present in an amount of from about 5 to about 50 percent by weight of the conductive coating composition.

22. A process according to claim 18 wherein the conductive coating has a coating weight of from about 1 to about 9 grams per square meter.

23. A process according to claim 19 wherein the total coating weight of the conductive coatings is from about 3 to about 14 grams per square meter.

24. A process according to claim 18 wherein the dielectric coating has a coating weight of from about 3 to about 14 grams per square meter.

25. A process according to claim 18 wherein the base sheet has a thickness of from about 2 to about 5 mils.

26. A process according to claim 18 wherein the anion is selected from the group consisting of chloride, fluoride, bromide, iodide, nitrate, sulfonate, sulfate, chlorate, bromate, iodate, phosphate, chromate, toluene sulfonate, methyl sulfate, and mixtures thereof.

27. A process according to claim 18 wherein the conductive coating contains a pigment.

28. A process according to claim 27 wherein the pigment is selected from the group consisting of clay, calcium carbonate, titanium dioxide, zinc oxide, talc, barium sulfate, silica, silicate, diatomaceous calcite, alumina trihydrate, and mixtures thereof.

29. A process according to claim 27 wherein the pigment is present in an amount of from about 5 to about 95 percent by weight of the conductive coating composition.

30. A process according to claim 27 wherein the pigment is present in an amount of from about 25 to about 75 percent by weight of the conductive coating composition.

31. A process according to claim 18 wherein the conductive coating contains a binder resin.

32. A process according to claim 31 wherein the binder resin is selected from the group consisting of poly(dimethyl diallyl ammonium chloride), poly(vinyl benzyl trimethyl ammonium chloride), poly{1,2-ethanediammonium,N-[(ethenyl-phenyl)methyl]-N,N,N',N',N'-pentamethyl dichloride}, polydextrose, poly(vinyl pyrrolidone), poly(vinyl alcohol), hydroxyethyl cellulose, modified starch, urea-formaldehyde resin, styrenemaleic anhydride copolymer, vinyl acetate-ethylene copolymers, vinyl acetate polymers, acrylic polymers, vinyl acetate-acrylic copolymers, styrene-butadiene copolymers, and mixtures thereof.

33. A process according to claim 31 wherein the binder resin is present in an amount of from about 5 to about 95 percent by weight of the conductive coating composition.

34. A process according to claim 31 wherein the binder resin is present in an amount of from about 25 to about 75 percent by weight of the conductive coating composition.

35. An electrographic paper according to claim 1 wherein the diquaternary ammonium compound is present in the conductive coating in an amount of from about 1 to about 100 percent by weight and the conductive coating optionally contains a pigment in an amount of from 0 to about 95 percent by weight and a binder resin in an amount of from 0 to about 95 percent by weight.

36. A process according to claim 18 wherein the diquaternary ammonium compound is present in the conductive coating in an amount of from about 1 to about 100 percent by weight and the conductive coating optionally contains a pigment in an amount of from 0 to about 95 percent by weight and a binder resin in an amount of from 0 to about 95 percent by weight.

* * * * *